Dec. 13, 1938.  G. H. HUNT ET AL  2,140,385
BRAKE MECHANISM
Filed June 4, 1936  4 Sheets-Sheet 1
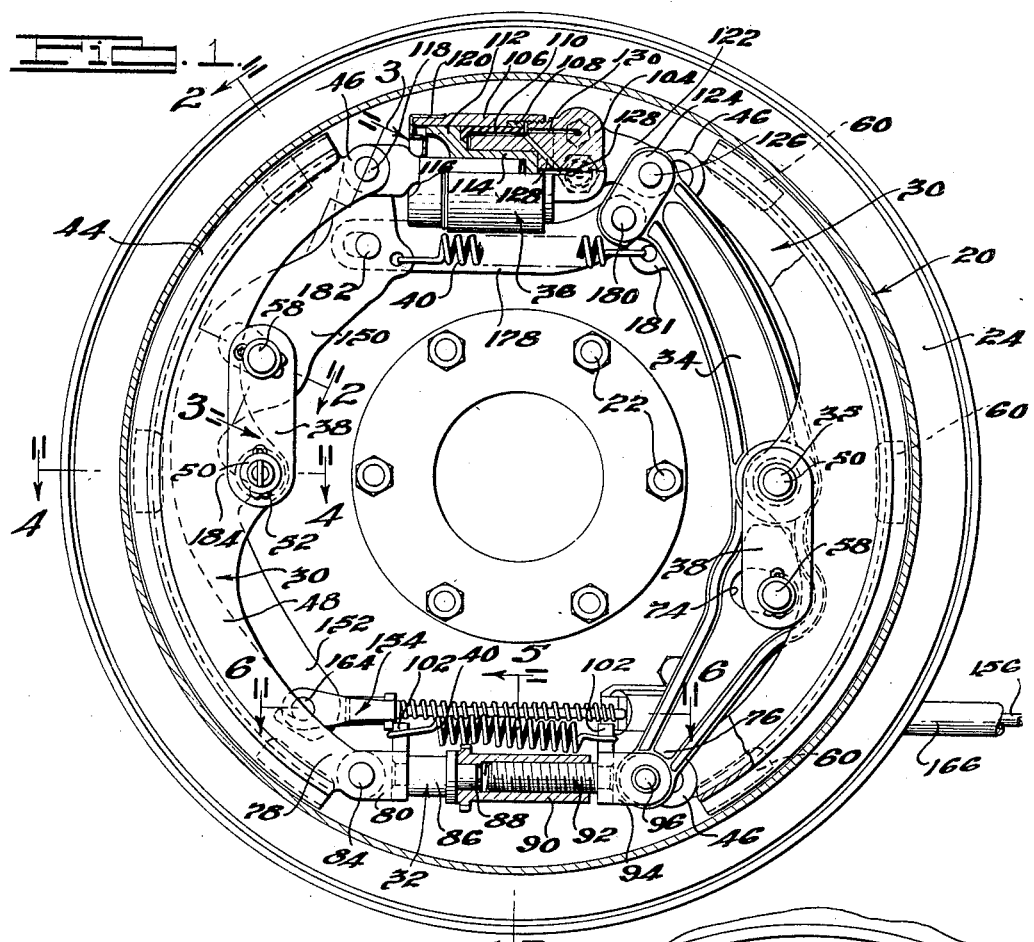
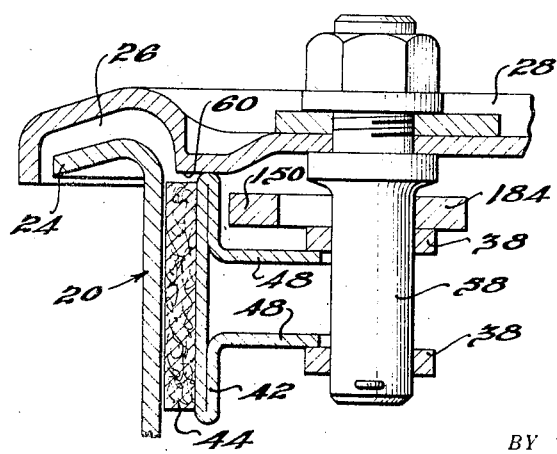
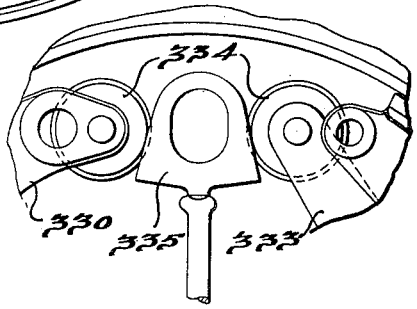
INVENTORS.
George H. Hunt,
Edward H. Berno.
BY
ATTORNEY

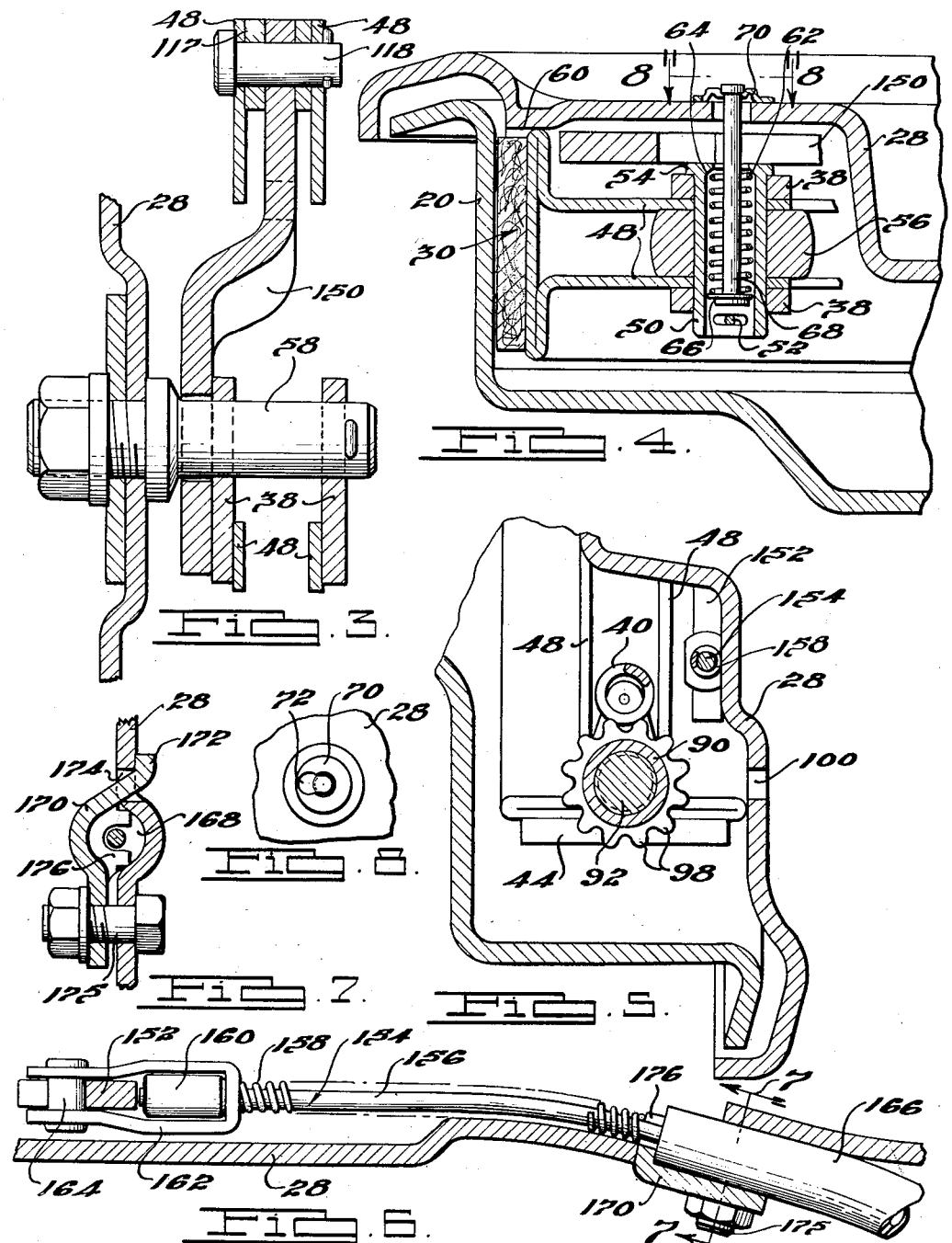

Dec. 13, 1938.　　　G. H. HUNT ET AL　　　2,140,385
BRAKE MECHANISM
Filed June 4, 1936　　　4 Sheets-Sheet 3
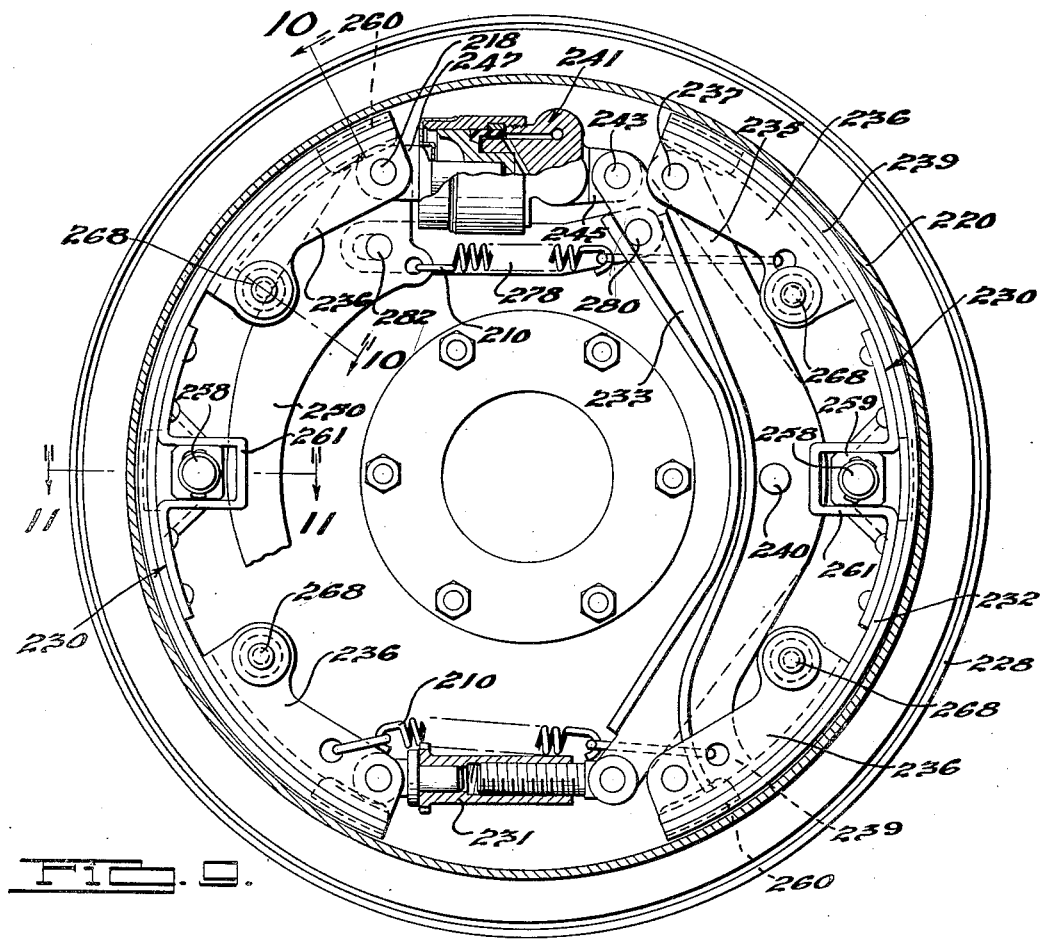
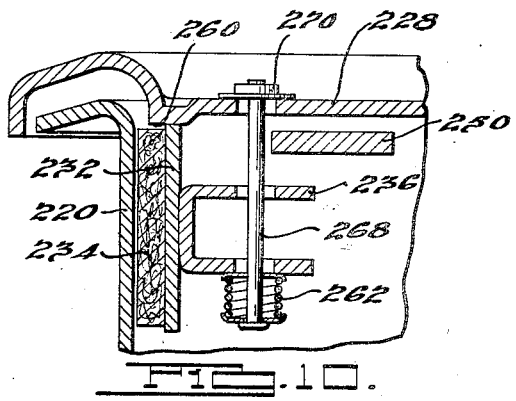
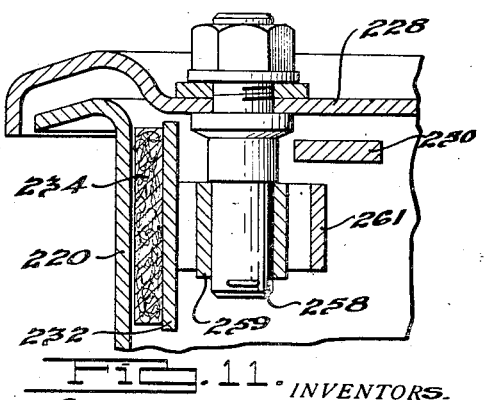
INVENTORS.
George H. Hunt,
BY Edward H. Berno.
ATTORNEY Dec. 13, 1938.　　　G. H. HUNT ET AL　　　2,140,385
BRAKE MECHANISM
Filed June 4, 1936　　　4 Sheets-Sheet 4

INVENTORS.
George H. Hunt,
BY Edward H. Berno.
ATTORNEY

Patented Dec. 13, 1938

2,140,385

UNITED STATES PATENT OFFICE 2,140,385

BRAKE MECHANISM

George H. Hunt and Edward H. Berno, Detroit, Mich., assignors to Borg-Warner Corporation, a corporation of Illinois Application June 4, 1936, Serial No. 83,488

18 Claims. (Cl. 188—106)

This invention relates to braking mechanism and particularly to a new and improved form of brake mechanism particularly adapted for use in wheel brakes of automotive vehicles.

The principal object of the invention is to provide a new and improved form of brake mechanism which is more efficient in operation, which is simpler in construction, which is less expensive to manufacture, which is more dependable in operation, and which is relatively simple to install and to service.

Another object of the invention is to provide a new and improved form of brake mechanism in which the brake shoes and actuating mechanism therefor are floating so that said shoes are free to seek their proper actuating position.

Another object of the invention is to provide a novel form of brake mechanism in which each of the brake shoes of the mechanism do the same amount of work, whether the vehicle is moving forwardly or backwardly.

Another object of the invention is to provide a brake mechanism which can be adjusted without requiring the jacking-up of the vehicle wheels.

Another object of the invention is to provide brake mechanism having automatic anchor pin adjustment therefor.

Another object of the invention is to provide a noval form of brake mechanism in which the amount of braking effort is directly proportional to the amount of pressure applied to the pedal and in which self-energizing and servo-action of the brake shoes are eliminated.

As illustrated in the embodiments of the invention selected for purposes of illustration our new and improved mechanism is shown in connection with a conventional form of brake drum and backing plate and comprises a pair of brake shoes, means for supporting said brake shoes so that said brake shoes are adapted to be moved radially in and out of contact with the surface of the brake drum. The brake mechanism is illustrated in conjunction with hydraulic and mechanical actuating means therefor.

For a better understanding of the invention reference may be had to the following specification taken in conjunction with the accompanying drawings of which there are four sheets and wherein:

Fig. 1 is an elevational view of a wheel brake mechanism embodying our invention, certain of the parts being broken away or illustrated in section for clearness;

Fig. 2 is a sectional view of the mechanism illustrated in Fig. 1 and taken on the staggered line 2—2 thereof;

Fig. 3 is a section taken on the staggered line 3—3 of Fig. 1;

Fig. 4 is a section taken on the line 4—4 of Fig. 1;

Fig. 5 is a section taken on line 5—5 of Fig. 1;

Fig. 6 is a section taken in a plane on line 6—6 of Fig. 1 looking in the direction of the arrow;

Fig. 7 is a section taken on the line 7—7 of Fig. 6;

Fig. 8 is a section taken in a plane on the line 8—8 of Fig. 4;

Fig. 9 is a view similar to Fig. 1 and illustrating a modified form of the invention;

Fig. 10 is a sectional view taken along the staggered line 10—10 of Fig. 9 looking in the direction of the arrows;

Fig. 11 is a sectional view taken along the line 11—11 of Fig. 9 looking in the direction of the arrow;

Fig. 12 is a modified form of the invention illustrating the application of a mechanical actuating means to the brake mechanism as disclosed in either of the emodiments.

Figure 13:
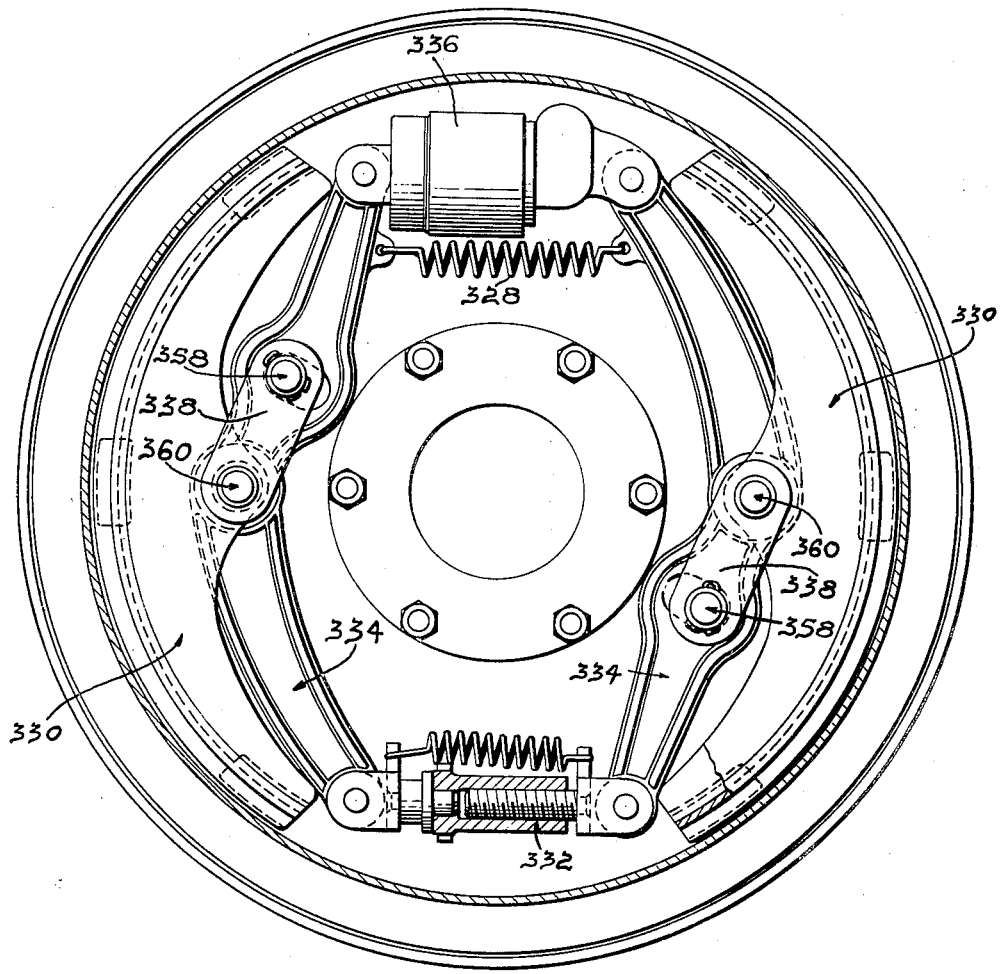
Fig. 13 is an elevational view of a modified form of wheel brake mechanism embodying our invention.

Referring now to the embodiment illustrated in Figs. 1 to 8, inclusive, at 20 there is illustrated a conventional cylindrical brake drum adapted to be secured to the hub of a vehicle wheel such as by a plurality of bolts 22 and which drum is provided with a peripheral flange 24 adapted to be disposed within a recess 26 formed in the periphery of a backing plate 28 which is adapted to be secured to a non-rotatable part of a vehicle axle. The brake operating mechanism is disposed within the space enclosed by the drum 20 and the backing plate 28 and as illustrated comprises a pair of brake shoes 30, an adjustable link 32 pivotally connected at one end to an end of one of the brake shoes 30 and at the other end to an end of a lever 34, the lever 34 being pivoted to the other of the brake shoes at 35, a hydraulic cylinder and piston 36 operatively connected at one end thereof to an end of one of the brake shoes 30 and at the other end thereof to one end of lever 34 and links 38 anchored at one end thereof to the backing plate 28 at 58 and at the other end thereof to the brake shoes 30 at 35. Retracting springs 40 are also provided for holding the shoes 30 out of operative engagement with the surface of the brake drum 20.

Each of the shoes may be identical in construction and comprise, as illustrated, a substantially rigid shoe member 42 provided on the face thereof with brake lining material 44 suitably secured thereto. As illustrated each end of the shoe is formed to provide an eye 46 and with a pair of web portions 48 for stiffening the shoe.

Each shoe has pivotally secured thereto a pair of links 38 (Fig. 4), the links 38 and web portions 48 being provided with an aligned opening in which a pin or sleeve 50 is disposed for pivotally connecting the links 38 to the brake shoe 30. A cotter pin 52 is secured in an opening in one end of the sleeve 50 for securing the parts against displacement and the other end of the sleeve 50 is provided with an enlarged head 54. The spacer member 56 may be disposed about the pin 50 and between the web portions 48.

The opposite ends of links 38 are pivoted to a pin 58 rigidly secured to the backing plate 28 (Fig. 2). The links 38 thus support the shoes 30 from the backing plate 28 and permit the shoes 30 to move with respect to the backing plate, the links 38 and pin 58 serving to take the torque reaction when the brakes are applied. The shoes when in inoperative position are disposed so that the lining 44 thereof preferably is spaced in the neighborhood of .015 of an inch from the braking surface of the drum 20. As the anchor pin 58 is disposed substantially as close to the braking surface of the drum 20 as the pin 50 which connects the links 38 to the webs 48 of the shoes 30, the movement of the brake shoes 30 toward and away from the brake surface of the drum 20 will be in a radial direction. Hence, the brake shoes are not self-energizing and the braking effort will be in direct proportion to the force expended by the operator of the vehicle at the brake pedal.

The backing plate 28 adjacent to the periphery and on the inside thereof is provided with six flats 60, three for each of the brake shoes 30, each set of three flats defining a plane. To prevent vibrations of the shoes 30, each of the shoes is constrained so as to hold an edge thereof in engagement with three of said flats. In this manner the brake shoes 30 are kept from wobbling and are kept aligned with the surface of the drum 20. A spring 62 is confined between a seat 64 formed internally of the sleeve 50 and a head 66 of a pin 68, the other end of the pin 68 extending through an aperture in the backing plate 28 and being seated in a disk 70 overlying the aperture in the backing plate 28, the disk 70 being provided with a key-hole slot 72 for assembling purposes.

The right hand brake shoe 30, as illustrated in Fig. 1, is pivoted to the lever 34 at 35 through the intermediary of a pin 50, the lever 34 being provided with an eye and being disposed between the web portions 48 in lieu of the spacer 56 as illustrated in Fig. 4. The lever 34 is provided with a slot 74 to permit the anchor pin 58 to extend therethrough. One end 76 of the lever is provided with a single eye and there is disposed between such end 76 of the lever and the end 78 of the left hand brake shoe an adjustable link 32.

The adjustable link 32 comprises a clevis 80 connected to the eye 46 at the end 78 of the left hand brake shoe by a pin 84, a stem 86 integrally secured to the clevis 80 and the end 88 of which stem 86 is adapted to be slidably received within one end of a sleeve 90, the sleeve 90 having a threaded engagement with a stem 92 carried by a clevis 94 which is connected to the eye at the end 76 of lever 34 by a pin 96. The sleeve 90 is provided externally thereof with fingers 98 adapted to be engaged by the end of a tool insertable through the aperture 100 in the backing plate 28 for the purpose of adjusting the length of the link 32. The spring 40 disposed between a pair of fingers 102 carried by the clevis 80 and 94 is adapted to engage the fingers 98 for preventing accidental displacement thereof.

The hydraulic piston and cylinder 36 comprises a cylindrical body member 104 having a threaded connection with a drum-shaped member 106. Within a recess internally provided in the drum 106 and between opposite shoulders of the member 106 and member 104 there is secured a metallic ring 108 to the inside of which is bonded a rubber or flexible sleeve 110, the flexible sleeve being bonded at one end thereof to a piston member 112 which is adapted to slide within the drum member 106. A sealing gasket may be disposed between the metallic ring 108 and the adjacent end of the body member 104 to prevent leakage of fluid. The piston member 112 is provided with a central cylindrical portion 114 which slides within a complementary shaped recess formed internally in the body member of 104 so as to form a bearing surface between the piston 112 and cylinder members 104 and 106. A piston rod 116 is connected to the piston 112 and at its end is formed as a clevis 117 (Fig. 3) for connection with the eye 46 at the upper end of the left hand brake shoe by a pin 118. A cap 120 may be fitted over the end of the drum 106 so as to have a sliding connection therewith and provided with a central opening for accommodating the shank of piston rod 116. The cylinder body 104 is provided with a clevis end 122 for connection with an eye 124 formed on the end of the lever 34, by a pin 126.

The cylinder body 104 is connected by a suitable conduit to a source of fluid such as a compressor and is provided with a passageway 128 through which fluid is conducted to the space between the piston 112 and the complementary parts of the cylinder. Bleed passage 130 preferably is provided in the cylinder body 104 for bleeding the cylinder and such passageway may be controlled by a conventional valve plug. The cylinder and piston 36 is not mounted upon the backing plate 28 but is carried by the lever 34 and the left hand brake shoe 30 so that the cylinder and piston 36 will float with the brake shoes 30 and the lever 34.

While it will be observed that a lever such as 34 is used in connection with only one of the brake shoes 30 it should be understood that a lever such as 34 may be used in connection with both of the shoes similar to the manner in which lever 34 is used in connection with the right hand shoe 30 and without affecting the characteristics or operation of the braking mechanism. Such a mechanism is illustrated in Fig. 13.

As the brake shoes 30 are carried at the ends of the pivoted links 38 no adjustment of the anchor pins 58 will be necessary either in initially assembling the brake or for service as the clearance between the lining 44 and the braking surface of the drum 20 can be adjusted entirely by adjustment of the length of the adjustable links 32, it being apparent that rotation of the sleeve 90 member 90 thereof will increase or decrease the distance between the pins 84 and 96.

By subjecting the cylinder and piston 36 to hydraulic fluid under pressure, an equal amount of force applied in parallel directions will be applied to the ends of the left hand brake shoe at the pins 118 and 84 and an equal amount of force in the opposite direction will be applied to the right hand brake shoe at the center thereof through the pin 50. The effective length of the arm of lever 34 between the pins 126 and 50 is equal to the effective length of the arm of lever 34 between the pins 96 and 50. The force applied to the left hand brake shoe 30 for actuating the same is equal to the force applied to the right hand brake shoe 30 for actuating the same, as the right hand brake shoe 30 is pivotally carried by the lever 34 and each brake shoe serves as a point of reaction for the force applied to the other brake shoe. As both of the shoes are actuated in the same manner, the braking effort of each shoe will be the same with the result that the lining of both of the brake shoes will wear at the same rate. While in the brake mechanism as illustrated the brake shoes are not self-energizing they can be made self-energizing by locating the anchor pin 58 closer to the center of the rotation of drum 20 so that brake shoes instead of moving radially would then move in an arc and then would become self-energizing. Such modification is illustrated in Fig. 13.

There is illustrated in connection with the embodiment of the invention disclosed in Figs. 1 to 8 mechanical means for actuating the shoes 30 so that the brake mechanism may be used as a parking brake. A lever 150 (Figs. 1 and 3) is connected to one of the brake shoes by the pin 118 and the eye 46 and such lever 150 is connected at an end 152 thereof, to an end of a cable 154.

The cable 154 comprises a flexible wire 156 disposed within a guide wire 158 and connected to a plug 160 disposed within a stirrup 162 having a pin 164 engaging the hooked end 152 of the lever 150. The backing plate 28 is provided with an opening through which the cable 156 may pass and externally of backing plate the cable is encased in a sheath 166. The backing plate 28 is formed to provide a groove 168 (Fig. 7) for accommodating a portion of the sheath 166 and a plate 170 is formed with a groove for receiving a part of the sheath 166, the plate 170 being provided with a tongue 172 adapted to be hooked into a slot 174 provided in the backing plate 28 and the backing plate 28 and plate 170 being provided with aligned openings so as to receive a bolt 175 for securing the same together. The plate is provided with a forked flange 176 against which the end of the sheath 166 abuts as well as an end of the spring 158, the sheath 166 being securely clamped between the plate 170 and the groove 168 formed in the backing plate 28.

A link 178 is connected at one end thereof to an eye, formed on the lever 34, by pin 180 and at the other end thereof through a pin and slot connection 182 to the lever 150, the pin and slot connection 182 permitting the hydraulic actuation of the brake shoes 30 without disturbing the set position of the mechanical operating means therefor. Movement of lever 150 in a counterclockwise direction will cause the lever to pivot about the pin and slot connection 182 and through the link 178 and the pin 118, apply force to the shoes to actuate the same. One of the springs 40 is operatively disposed between the lever 150 and an eye 181 formed on the lever 34 for assisting in moving the shoes to their inoperative position.

In the modification illustrated in Figs. 9 to 11 the brake shoes 230 comprise a flexible metallic strap or band 232 having lining 234 applied to the face thereof and provided at each end thereof on the side opposite the lining with a bracket member 236. The drum 220 of this modification is similar in construction to the drum 20 of the modification illustrated in Fig. 1 and the backing plate 228 of this modification is similar in construction to the backing plate 28 and likewise is provided with a set of three flats 260 for each of the brake shoes 230.

For each of the shoes there is rigidly secured to the backing plate 228 an anchor pin 258 having a block 259 journaled thereon and which block 259 is adapted for relative sliding movement within a guide 261 carried by the band 232 of the brake shoe 230. The guide 261 is formed by a U-shaped strap and is cooperable with the anchor pin 258 and block 259 carried thereby for supporting the shoe 230 for radial movement toward and away from the braking surface of drum 220. The anchor pin 258 is adapted to take the torque reaction due to the application of the brakes.

For holding each of the brake shoes 230 against the flats 260 formed on the backing plate 228 a pin 268 and a spring 262 are operatively disposed between a disk 270 disposed externally of the backing plate 228 and each of the brackets 236 of the brake shoes 230.

The right hand shoe, looking at Fig. 9, is provided with a reinforcing bar 235 which at one end thereof is connected to one of the brackets 236 by a pin 237 extending through an aligned opening in the bar 235 and bracket 236 and at the other end 239 is provided with a surface adapted to be seated upon a surface of the bracket 236. A lever 233 similar in construction to the lever 34 is pivotally connected to the bar 235 by a pin 240. One end of the lever 233 is connected by an adjustable link 231 similar to the adjustable link 32 to one of the brackets 236 provided on the left hand brake shoe 230, and the upper end of the lever 233 is connected to one end of a hydraulic piston and cylinder 241 through the intermediary of a pin 243 and a clevis 245, the other end of the hydraulic cylinder and piston 241 being connected by means of a clevis 247 and a pin 218 to the upper end of the left hand brake shoe 230. A lever 250 may be connected to the left hand brake shoe by means of pin 218 for mechanically actuating the brake shoes 230 in a manner similar to that in which the lever 150 is adapted to mechanically actuate the brake shoes of the modification illustrated in Figs. 1 to 8. A link 278 is connected at one end thereof to the lever 250 by a pin and slot connection 282 and at the other end thereof is connected to the lever 233 through a pin and eye connection 280. A pair of springs 210 are operatively disposed between the brake shoes 230 for constraining the same toward their inoperative position. The lever 250 may be connected to a cable such as the cable 154 in a manner similar to that in which the lever 150 is connected to the cable 154 to be operated thereby.

The cable 154 may be connected to a parking brake lever so as to permit operation thereof. The hydraulic piston and cylinder 36 and 241, which are not secured to the backing plates, are adapted to be operated from a master cylinder or compressor under control of the operator of the vehicle such as through a brake pedal or any other suitable control.

In Fig. 12 there is illustrated a modified form of brake mechanism wherein mechanical operating means are provided for actuating the brake shoes instead of the hydraulic means 36 of Fig. 1 or 241 of Fig. 9. In this instance one end of one of the brake shoes 330 and one end of a lever 333 similar to the lever 233 are provided with rollers or wheels 334 which are adapted to be spread by a wedge-shaped member 335 adapted to be moved radially outwardly for separating the wheels or rollers 334, for actuating the brake mechanism.

The modification, a portion of which is illustrated in Fig. 12, may be otherwise like the mechanism illustrated in either Figs. 1 or 9.

The construction illustrated in Fig. 13 shows a modified form of the invention employing two levers, such as lever 34 of the construction illustrated in Fig. 1. In Fig. 13, the construction illustrated comprises a pair of brake shoes 330, an adjustable link 332 pivotally connected at its ends to a pair of levers 334, the other ends of levers 334 being pivoted to a hydraulic cylinder and piston 336. As the construction illustrated in Fig. 13 embodies essentially the parts illustrated in Fig. 1, plus an additional lever, the reference characters employed in Fig. 1 have been used in Fig. 13, with a prefix 3 added thereto. The construction of the parts illustrated in Fig. 13 may be identical with the corresponding parts employed in the construction illustrated in Fig. 1. In Fig. 13, the shoes 330 are carried by links 338 which are anchored to the backing plate 328 at 358, and the levers 334 are connected to the shoes 330 at the same point as the links 338. The only other difference between the construction illustrated in Fig. 1 and that illustrated in Fig. 13 is that in Fig. 13 the anchor points of the links 338 are located closer to the center of rotation than the anchor point 360 between the links 338, the shoes 330 and the levers 334. In the construction illustrated in Fig. 13, if the wheel rotates in a clockwise direction as the figure is laid out, the brakes will be self-energizing.

While the invention has been illustrated in several different forms the operation of each of these forms, as illustrated, is the same.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

We claim:

1. Brake mechanism comprising a brake drum, a friction element cooperable therewith, a support, a link pivotally connected to said support and to the center of said friction element for supporting said friction element for radial movement toward and away from said drum, and means arranged relative to said friction element so as not to interfere with the pivoting of said element on said link upon engagement of said friction element with said drum and operable for moving said friction element into operative engagement with said drum.

2. Brake mechanism comprising a drum, a friction element cooperable therewith, a support, a link pivotally connected to said support and to the center of said friction element, the point of said pivotal connection between said link and said friction element being spaced radially from the center of rotation of said drum substantially the same amount as the pivotal connection between said link and said support, and means arranged relative to said friction element so as not to interfere with the pivoting of said element on said link upon engagement of said friction element with said drum and operable for moving said friction element into operative engagement with said drum.

3. Brake mechanism comprising a drum, a friction element cooperable therewith, a support, a link pivotally connected to the center of said friction element and to said support for supporting said friction element for movement toward and away from said drum, and means for applying force in a radial direction to said friction element at said center thereof for moving said friction element into operative engagement with said drum.

4. Brake mechanism having in combination a drum, a friction element cooperable therewith, a support, a link pivoted to said support and to the center of said friction element for supporting the same for movement toward and away from said drum, brake applying means, and a lever having a pivotal connection with said friction element and operatively disposed between said brake applying means and said friction element.

5. Brake mechanism comprising a drum, a plurality of friction elements cooperable with said drum, means for supporting said friction elements for movement toward and away from said drum, a lever pivotally connected to one of said friction elements, a link operatively disposed between one end of said lever and one end of another of said friction elements, and brake applying means operatively disposed between the other end of said lever and the other end of said another friction elements.

6. Brake mechanism comprising a drum, a plurality of friction elements cooperable with said drum, means for supporting said friction elements for movement toward and away from said drum, a lever pivotally connected to one of said friction elements, an adjustable link operatively disposed between one end of said lever and one end of another of said friction elements, and single brake applying means operatively disposed between the other end of said lever and the other end of said another friction elements.

7. Brake mechanism comprising a drum, a pair of friction elements cooperable with said drum, a support, means carried by said support and adapted for supporting said friction elements for movement toward and away from said drum, a lever having a pivotal connection with one of said friction elements, a link operatively disposed between one end of said lever and one end of the other of said friction elements, and brake applying means operatively disposed between the other end of said lever and the other end of said other of said friction elements and carried thereby, said first mentioned means being adapted to support the friction elements, said lever, said link, and said brake applying means for floating movement relative to said support.

8. Brake mechanism comprising a drum, friction means cooperable with said drum, brake applying means adapted for operating said friction means, and means for supporting said friction means and said brake applying means for floating movement relative to said drum, said supporting means being constructed so as to support said friction means for movement toward said drum in a substantially radial path.

9. Brake mechanism comprising a drum, a pair of friction elements cooperable with said drum, means for supporting said friction elements for movement toward and away from said drum, a lever having a pivotal connection at its center with one of said friction elements at the center thereof, a link operatively disposed between one end of said lever and one end of the other of said friction elements, and brake applying means operatively disposed between the other end of said lever and the other end of the other of said friction elements.

10. Brake mechanism comprising a drum, a pair of braking elements cooperable with said drum, means for individually supporting each of said elements so that the same will be energized by rotation of said drum upon engagement therewith, means operatively associated with said braking elements and carried thereby, and including a single brake applying means operable for applying an equal force to each of said braking elements for moving said braking elements into operative engagement with said drum.

11. Brake mechanism comprising a brake drum, a backing plate, a pair of braking elements cooperable with said drum, means carried by said backing plate and adapted to support said braking elements for movement toward and away from said drum, a lever pivotally carried by one of said braking elements, a link operatively disposed between one end of said lever and one end of the other of said braking elements, and means operatively disposed between the other end of said lever and the other end of the other of said braking elements for actuating said braking elements.

12. Brake mechanism comprising a brake drum, a backing plate, a pair of braking elements cooperable with said drum, means carried by said backing plate and adapted to support said braking elements for movement toward and away from said drum, a lever pivotally carried by one of said braking elements, a link operatively disposed between one end of said lever and one end of the other of said braking elements, and means operatively disposed between the other end of said lever and the other end of the other of said braking elements for actuating said braking elements, and a toggle link operatively disposed between said other end of said lever and said other end of said other of said braking elements adapted for actuating the same independently of said brake actuating means.

13. Brake mechanism comprising a drum, a pair of braking elements cooperable with said drum, means for movably supporting said braking elements so that the same will be energized by rotation of said drum upon engagement therewith, a lever having a pivotal connection to one of said braking elements, a link connected to one end of said lever, brake applying means connected to the other end of said lever, and means for connecting said brake applying means and said link to the other of said braking elements.

14. Brake mechanism comprising a brake drum, a backing plate, means carried by said backing plate and adapted to movably support said braking elements so that the same will be energized by rotation of said brake drum upon engagement therewith, a lever having a pivotal connection at its center with one of said braking elements, a link connected at one end thereof to one end of said lever, brake applying means operatively associated with the other end of said lever, and means for connecting the other end of said link and said brake applying means to the other of said braking elements.

15. Brake mechanism comprising a drum, a braking element cooperable therewith, a lever, means for locating the fulcrum point of said lever, a link operatively disposed between one end of said lever and one end of said braking element, and brake applying means operatively disposed between the other end of said lever and the other end of said braking element.

16. Brake mechanism comprising a brake drum, a braking element cooperable therewith, means for floatingly supporting said braking element, a lever having a fulcrum point at its center, means for locating said fulcrum point, a link operatively disposed between one end of said lever and said braking element, and brake applying means operatively disposed between the other end of said lever and said braking element.

17. Brake mechanism comprising a brake drum, a braking element cooperable therewith, a backing plate, a link pivotally connected to said backing plate and to said braking element, a lever having a fulcrum point at its center, means for locating said fulcrum point, a link connected at one end thereof to one end of said lever and at the other end thereof to one end of said braking element, and brake applying means operatively disposed between the other end of said lever and the other end of said braking element.

18. Brake mechanism comprising a brake drum, a friction element cooperable therewith, a support, a link pivotally connected to said support and to the center of said friction element for supporting said friction element for movement toward and away from said drum, a lever having a pivotal connection at its center with said link and said friction element at the point of connection between said link and said friction element and means for applying an equal amount of force to each end of said lever.

GEORGE H. HUNT.
EDWARD H. BERNO.